Jan. 17, 1956     O. GARAPOLO ET AL     2,730,963
BEEF DROPPER

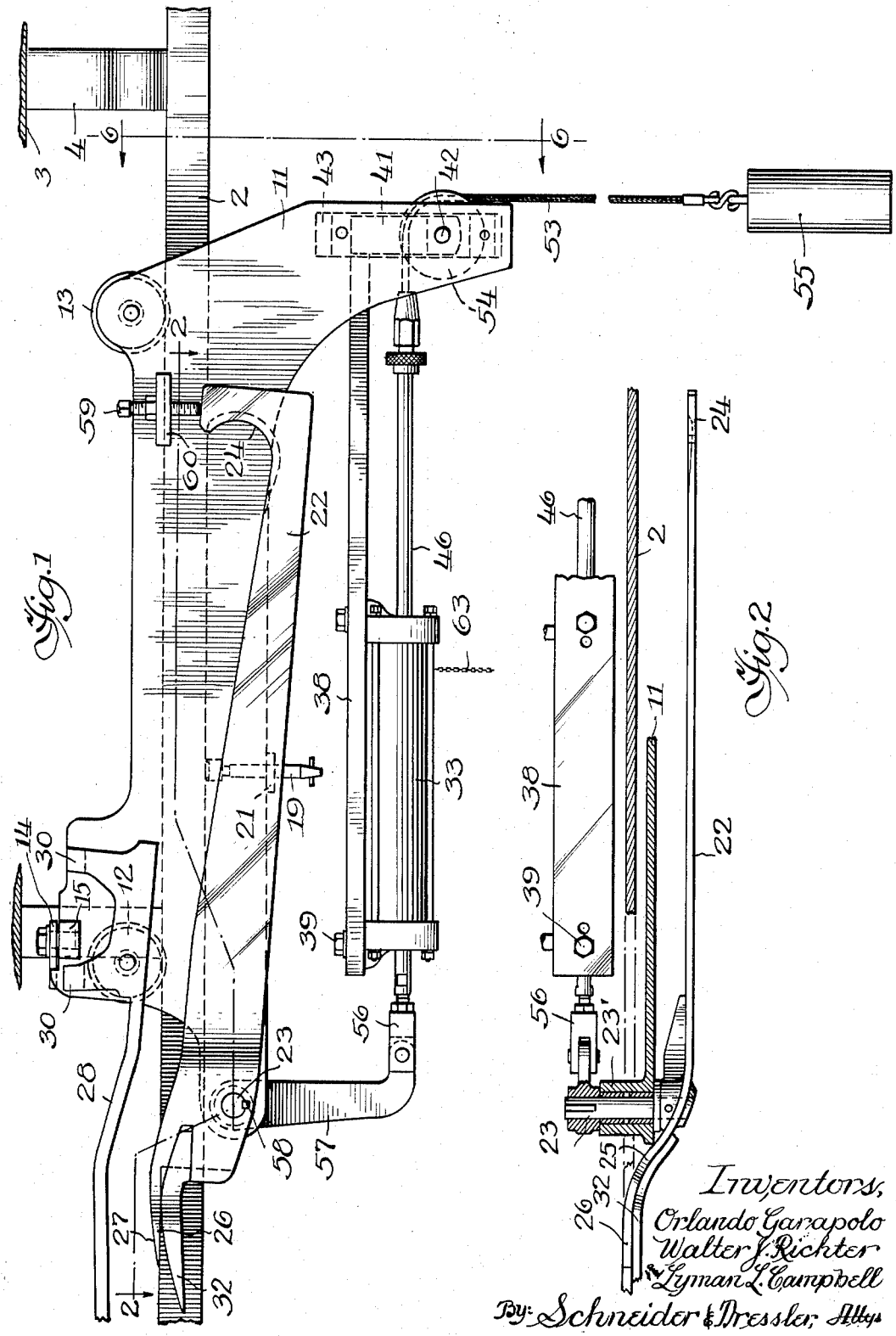

Filed Oct. 6, 1951     4 Sheets-Sheet 2

Inventors,
Orlando Garapolo
Walter J. Richter
and Lyman L. Campbell
By: Schneider & Dressler, Attys.

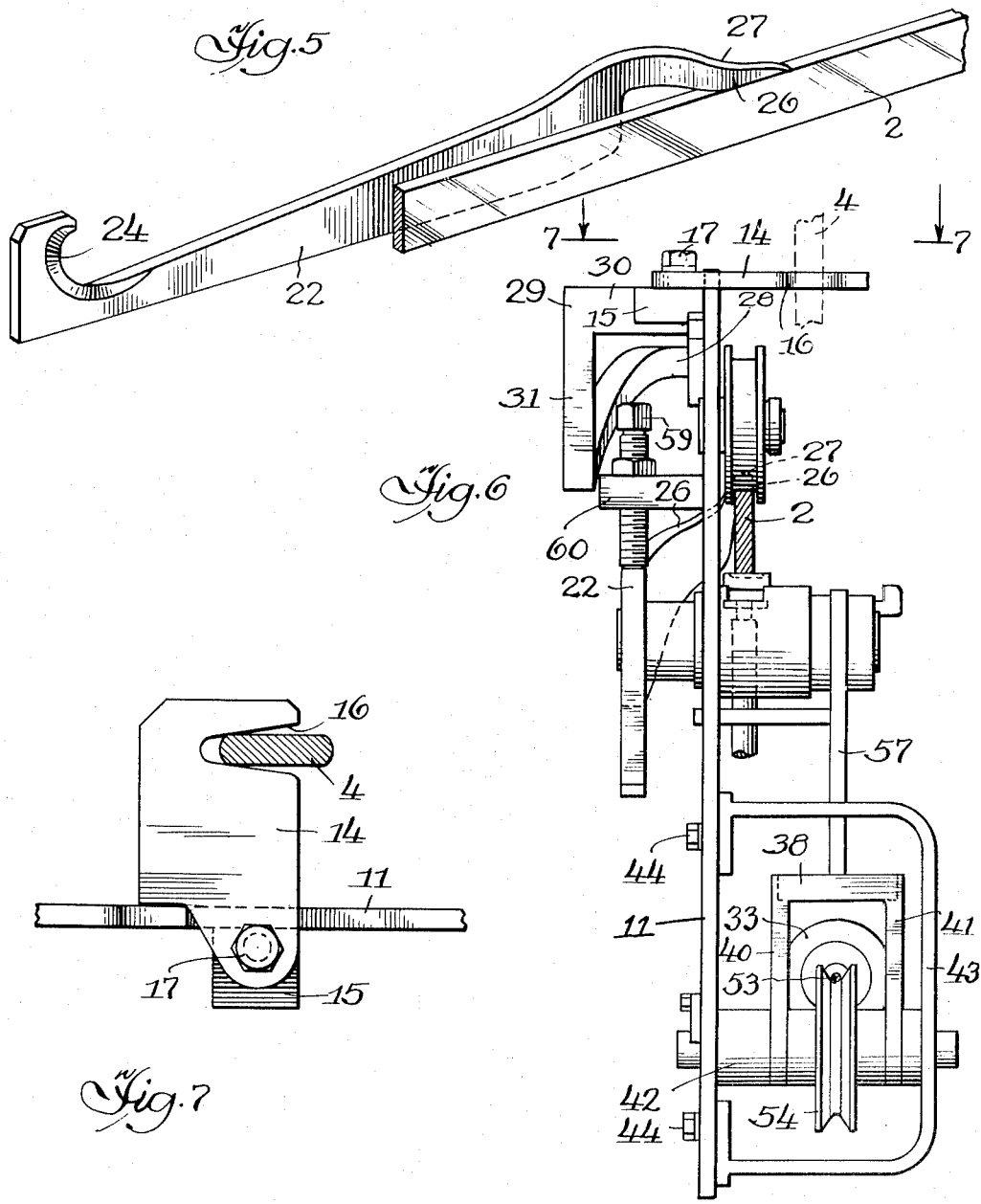

Jan. 17, 1956     O. GARAPOLO ET AL     2,730,963
BEEF DROPPER
Filed Oct. 6, 1951     4 Sheets-Sheet 4
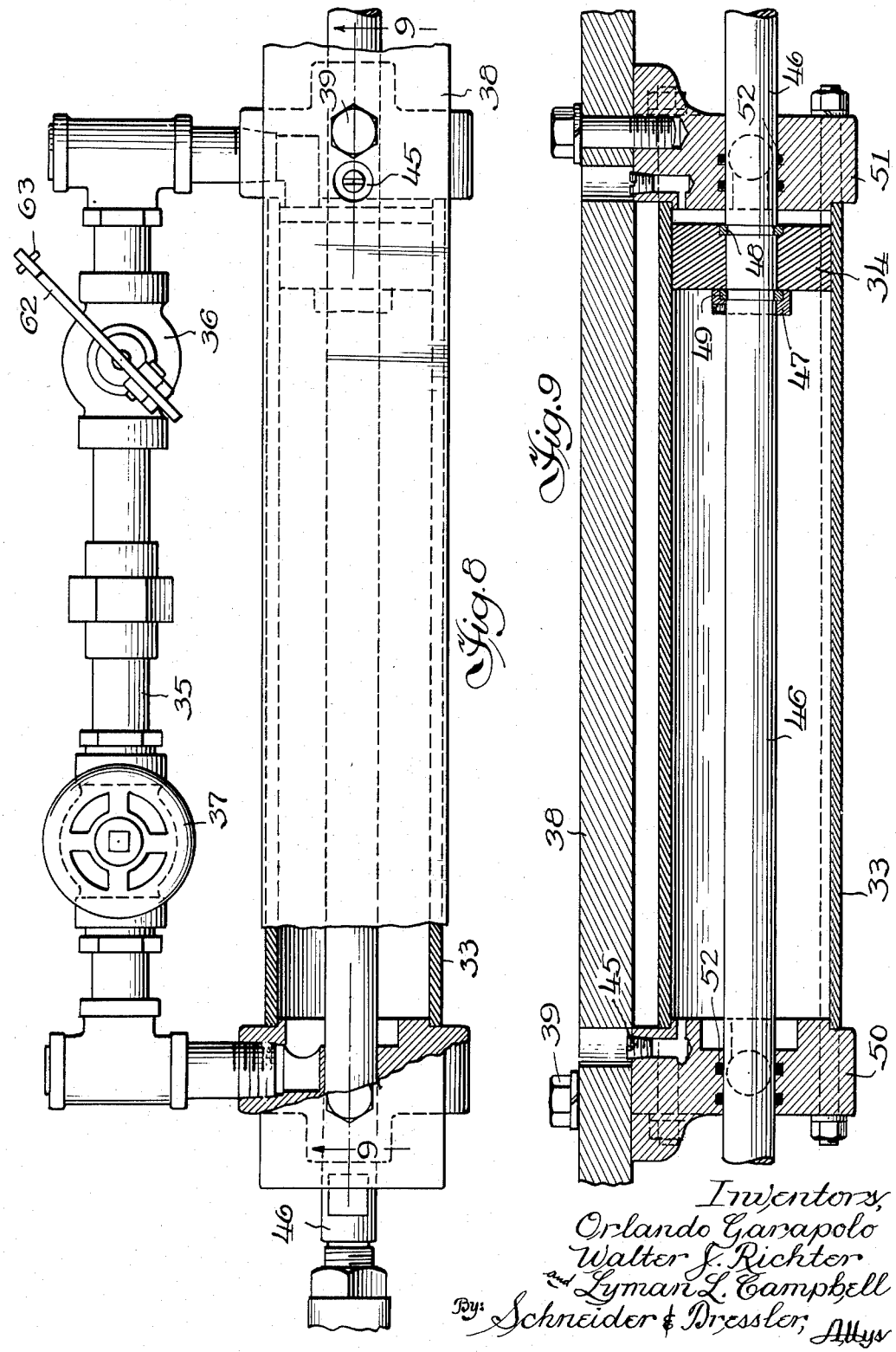
Inventors,
Orlando Garapolo
Walter J. Richter
and Lyman L. Campbell
By: Schneider & Dressler, Attys

¹

United States Patent Office 2,730,963
Patented Jan. 17, 1956

2,730,963

BEEF DROPPER

Orlando Garapolo, Walter J. Richter, and Lyman L. Campbell, Chicago, Ill., assignors to Wilson & Co., Inc., a corporation of Delaware Application October 6, 1951, Serial No. 250,058

10 Claims. (Cl. 104—96)

This invention relates to a beef dropper, and is particularly concerned with means for facilitating the handling of sides of beef in loading such sides of beef in a freight car or trailer truck.

It has been customary to use an overhead conveyor to move sides of beef from the freezing or storage room to an area adjacent a freight car into which the meat is to be loaded. The conveyor comprises an overhead rail with a plurality of trolleys mounted thereon and arranged to be moved from the storage area to the loading area. A hook is secured to each trolley, and the rear portion of each side of beef is impaled on one of the hooks. The trolleys must be high enough to keep the forequarters of beef from dragging across the floor. As each side of beef reaches the loading area it is cut transversely to separate it into forequarter and hindquarter, and the forequarter is manually carried or lugged into the freight car. This system is quite satisfactory for the forequarters, but the trolleys are positioned so high, because of the length of the sides of beef, that a man standing on the floor can not unhook the hindquarter therefrom. It is necessary to provide a raised platform for both the operator whose job it is to unhook the hindquarters and the "lugger" who is to carry them into the freight car. This slows down the loading operation considerably.

In accordance with the present invention each side of beef is impaled on a trolley and is cut transversely into quarters in the conventional manner. However, after the forequarter has been removed, the trolley from which the hindquarter is suspended is lowered to bring it within the reach of an operator standing on the floor, who positions the hindquarter in a hand truck and then unhooks it. The same operator who cuts down the forequarter also unhooks the hindquarter, thereby eliminating one operator and speeding up loading. The lowered trolley is removed for cleaning, and the operation is repeated with the next side of beef. The beef dropping mechanism is provided with a hydraulic system which makes the dropping of the beef a smooth, easy operation and returns the dropping mechanism quickly and smoothly to its initial position to receive the next hindquarter of beef. The valves which control the movement of the beef dropping mechanism are arranged to provide controlled movement when the mechanism is being dropped or returned to its original position.

Although the present invention is primarily concerned with means for handling beef, it is to be understood that it may also be utilized in handling other meat, or, as a matter of fact, any material that is conveyed at a certain height by means of a trolley on a rail and must be dropped a predetermined distance at one particular location.

The structure by means of which the above and other advantages of the invention are attained will be described in detail in the following specification, taken in conjunction with the accompanying drawings, showing a preferred illustrative embodiment of the invention, in which:

Figure 1 is a side elevation of a beef dropper embodying the invention, with the dropper arm in its initial position ready to receive one of the trolleys which carries the hook on which the beef is impaled;

Fig. 2 is a cross sectional view, taken along the line 2—2 of Figure 1;

Fig. 5 is a detail perspective view showing the dropper arm proper and integral diverting rail that guides the trolleys from the rail to the dropper arm;

Fig. 6 is an end elevation, taken along the line 6—6 of Figure 1;

Fig. 7 is a fragmentary top elevation, taken along the line 7—7 of Figure 6;

Fig. 8 is a detail top elevation of the hydraulic mechanism for controlling movement of the dropper arm; and Fig. 9 is a cross section view of the hydraulic mechanism, taken along the line 9—9 of Figure 8.

Figure 3:
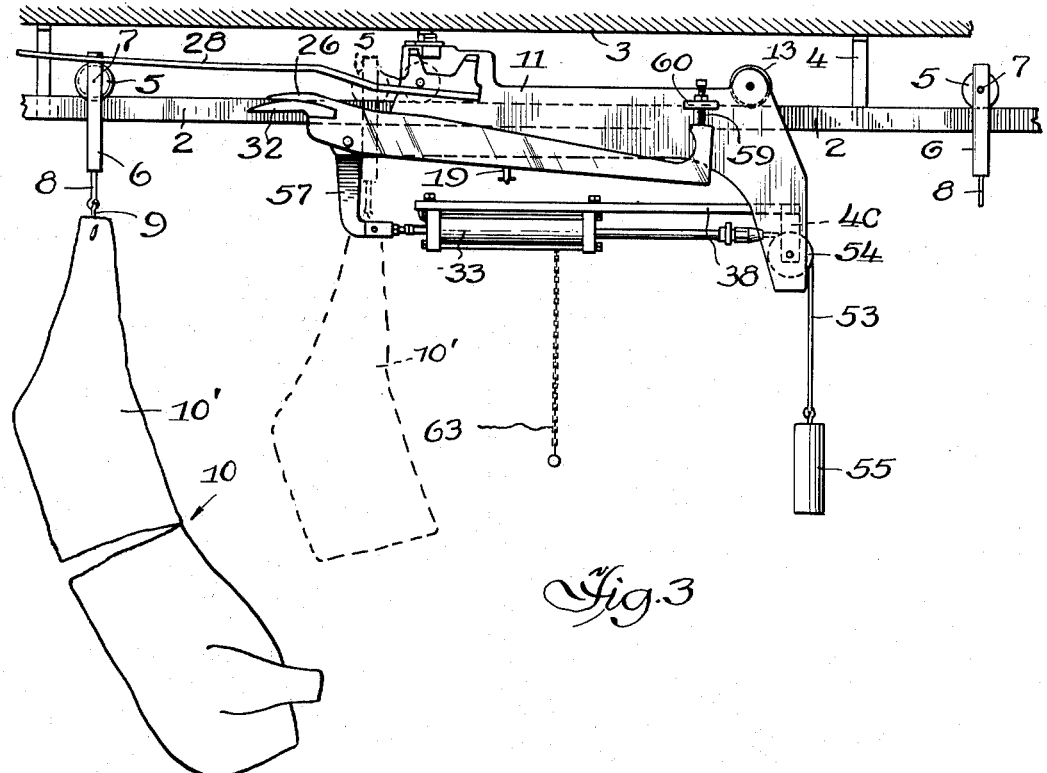
Fig. 3 is a side elevation of the beef dropper with a trolley positioned on the approach side of the dropper arm.
Figure 4:
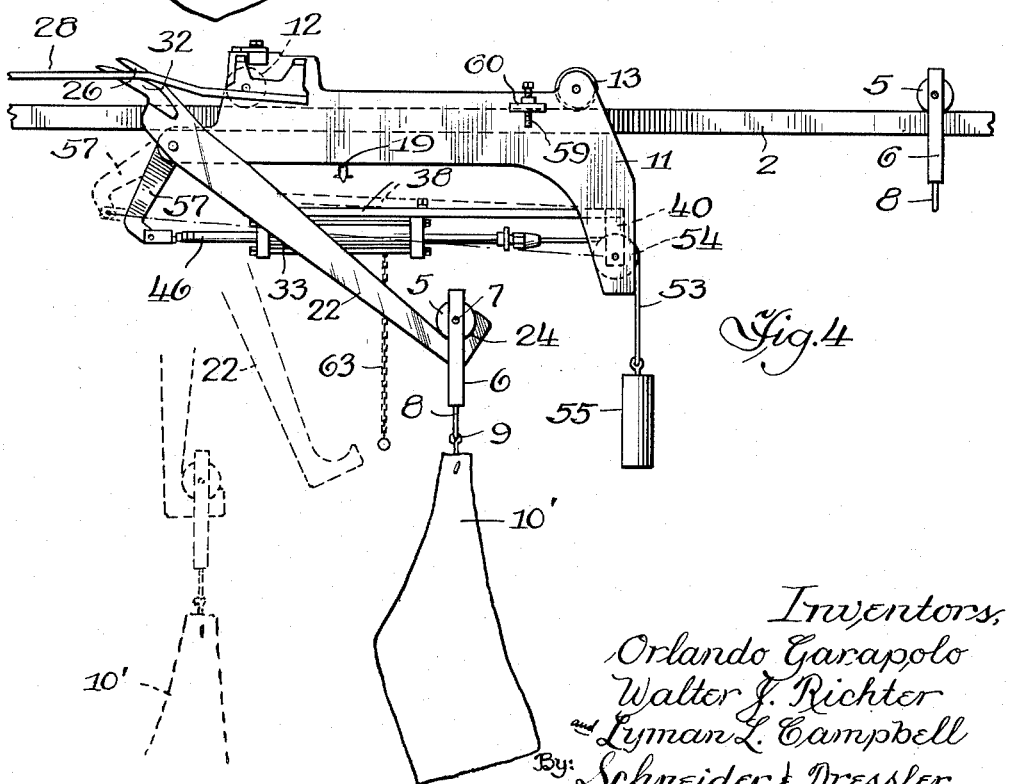
Fig. 4 is a side elevation of the beef dropper with the dropper arm in an intermediate dropping position.

In the drawings, the reference numeral 2 indicates a rail suspended from the ceiling 3 by means of a plurality of hangers 4. A plurality of trolleys with flanged rollers 5 loosely mounted on rail 2 each has an arm or frame 6 pivotally secured thereto, as indicated at 7, Figs. 3 and 4, so that the arm may remain vertical while roller 5 rolls along rail 2. Each arm 6 has a ring member 8 depending therefrom, and a hook 9 swingably secured to the ring member. Each hook 9 is adapted to receive a side of beef 10. Each beef is manually pushed from the area where it is impaled on the hook 9 to the beef dropper which is located in the area adjacent the freight car or trailer truck into which the beef is to be loaded.

The beef dropper comprises a main frame plate 11 upon which a pair of flanged rollers 12 and 13 is rotatably mounted. Rollers 12 and 13 are positioned adjacent opposite ends of main frame plate 11 and are each mounted on top of rail 2 to allow the beef dropper to be moved longitudinally along the rail to any desired position. When the beef dropper is properly positioned it is secured in place by means of a latch 14 which is pivotally mounted on a lug 15 projecting laterally from the top edge of main frame plate 11. Lug 15 may be integral with the main frame plate or may be rigidly secured thereto in any suitable manner, as by welding. One edge of latch 14 is notched, as indicated at 16, to engage one of the hangers 4 to hold the beef dropper against longitudinal movement. A shouldered screw 17 passing through latch 14 and threaded through lug 15 is tightened to hold the latch in position to engage the hanger. Whenever it becomes necessary to move the beef dropper longitudinally past a hanger latch 14 is swung around the screw to move it out of the way of the hangers.

A screw 19 provides added security for holding the beef dropper in position on the rail. The screw 19 is threaded through a nut 21 welded to the main frame plate below rail 2, at a point spaced between flanged rollers 12 and 13. Screw 19 is loosened all the way to allow free longitudinal movement of the beef dropper. The screw 19 cooperates with latch 14 to prevent longitudinal movement of the beef dropper when it is tightened against the bottom edge of rail 2.

A dropper arm 22 is mounted on a shaft 23 journalled in a bearing 23' which is secured to main frame plate 11. The upper edge of the dropper arm is similar to the upper edge of rail 2 in width, and terminates in a hook-shaped curve 24 at its rear end. The major portion of dropper arm 22 extends parallel to rail 2, and the portion extending forwardly of pivot 23 is offset, as indicated at 25, to bring its forward end 26 into the vertical plane of rail 2. The forward end 26 forms a diverting rail which may be positioned so that its lower edge rests directly on the upper edge of rail 2. The forward end 26 is curved at a slight vertical angle, as shown at 27 in Fig. 1, so that each trolley roller 5, carrying a hindquarter of beef 10', may be rolled from rail 2 over the diverting rail 26 and along the dropper arm until it abuts the curved surface 24 at the rear end of the dropper arm.

A top guard rail 28 is provided above the diverting rail 26 to facilitate transfer of the roller 5 from rail 2 to diverting rail 26. The rear end of top guard rail 28 is supported by a bracket 29 which comprises a yoke 30 welded or otherwise rigidly secured to main frame plate 11, and a vertical plate 31 to which the top guard rail is welded. The top guard rail is positioned above the diverting rail a distance approximately equal to the diameter of roller 5. The top guard rail follows the contour of the diverting rail and projects forwardly thereof a distance sufficient to insure the engagement with trolley arm 6 before the roller comes into contact with the forward edge of the diverting rail. The portion of top guard rail 28 projecting forwardly of the diverting rail is parallel to rail 2. It is obvious that trolley arm 6 is kept true and straight when it engages the forward end of diverting rail 26, and the engagement of the top guard rail with the upper portion of trolley arm 6 prevents the roller 5 from being displaced from its track.

In order to provide additional security for the transfer of roller 5 to the dropper arm a prong 32 is rigidly secured to one side of diverting rail 26. The prong 32 is shaped to follow the vertical contour of the diverting rail, but its upper edge is positioned slightly below the upper edge of the diverting rail so that it engages one flange of roller 5. This prevents roller 5 from flattening the starting angle of diverting rail 26.

The tendency of the dropper arm 22 to swing downwardly about its pivot 23 is overcome by a hydraulic system which comprises a cylinder 33 housing a piston 34 and a hydraulic line 35 connecting opposite ends of the cylinder. The line 35 contains a self closing valve 36 which allows free flow in one direction and manual control in the other. It also contains a valve 37 which controls fluid in one direction and is free flowing in the other direction. The cylinder 33 is supported by a plate 38 to which it is bolted, as indicated at 39. One end of plate 38 is welded to a pair of plates 40 and 41 which are mounted on a bearing 42. The bearing permits pivotal movement of plates 40 and 41 for a purpose hereinafter described. One end of bearing 42 is mounted in main frame plate 11, and its other end is mounted in a U-shaped bracket 43 which is bolted to the main frame plate, as indicated at 44.

The hydraulic cylinder 33 is provided with a bleed plug 45 at each end so that air can be removed and the system completely filled with fluid. Piston 34 has a rod 46 projecting therethrough and secured thereto in any suitable manner to keep the rod from moving longitudinally relative to the piston. It is possible to use a pair of axially aligned piston rods secured to opposite sides of piston 34, but the single rod provides a simpler structure. The collars 47 and 48 which prevent relative movement between the rod and the piston are provided with suitable packing to prevent fluid from leaking through the bore of the piston. The piston rod extends through opposite ends 50 and 51 of the cylinder, and each end is provided with suitable packing 52 to prevent the fluid from leaking through the cylinder ends.

One end of piston rod 46 is connected in any suitable manner to a rope or wire cable 53 which runs over a pulley 54 rotatably mounted on bearing 42. A counterweight 55 or any other counterweighing means is secured to the free end of rope 53. The other end of the piston rod is connected to a yoke 56 which is pivotally secured at its bifurcated end to one end of an arm 57. The arm 57 is L-shaped, and its other end is mounted on shaft 23. A key 58 (Fig. 1) connects dropper arm 22 and arm 57 to shaft 23 so they rotate as a unit. As shown in dotted lines in Fig. 4, it is necessary for the plate 38, to which cylinder 33 is secured, to pivot slightly when dropper arm 22 is moved downwardly. The rotatable mounting of plates 40 and 41 on bearing 42 permits such pivotal movement.

Counterweight 55 is made of lesser weight than the beef to be carried by dropper arm 22, and is of greater weight than the unbalanced weight of dropper arm 22. Accordingly, when the beef supported on hook 9 is rolled onto dropper arm 22, dropper arm 22 will drop into the vertical position shown in dotted lines in Figure 4 by overcoming the tendency of counterweight 55 to maintain dropper arm 22 in the substantially horizontal position shown in Figures 1 and 3.

An adjusting screw 59, threaded through a nut 60 welded to main frame plate 11, is adjusted to abut the upper edge of dropper arm 22 adjacent the curved portion 24 when the bottom of diverting rail 26 is flat against the upper surface of rail 2. This arrangement permits the trolleys, each carrying a hindquarter of beef 10', to be successively rolled from rail 2 on to dropper arm 22 smoothly and easily.

When a side of beef 10 is suspended from a trolley on rail 2, the forequarter of the beef, which is its lowermost half of the side of beef, is at a level convenient for operators standing on the floor. Accordingly, the side of beef is positioned into a hand truck, the beef is cut transversely and the forequarter is loaded into the freight car. The trolley with the hindquarter of the beef, which is its uppermost half of the side of beef, is then pushed onto dropper arm 22. When trolley roller 5 engages the dropper arm 22 and rolls past the point of pivot 23, the added weight on the dropper arm causes the dropper arm to start its downward motion because the controlled side of valve 37 is operating and the free flow side of valve 36 is cooperating to allow the trolley roller to continue to and nest in the curved end 24 of the dropper arm 22, as the dropper arm stops in a vertical position to the floor. The hindquarter of beef is then unhooked and loaded into the freight car.

When the hindquarter of beef is removed from hook 9 and the trolley has been lifted off of the dropper arm end 24, handle 62 of valve 36 is pulled downwardly by a chain or cord 63 to open manual control side of valve 36, allowing free flow of fluid therethrough, and the free flowing side of valve 37 cooperating to allow immediate return of dropper arm 22 to its initial position so that it is ready to receive the next trolley with a hindquarter suspended therefrom. The adjustable screw 59 engages the end of the dropper arm on its return movement so that the forward end of the dropper arm does not slam against rail 2, thereby preventing damage to the lead end of diverting rail 26.

While we have described a preferred embodiment of our invention in considerable detail, it will be understood that the description thereof is intended to be illustrative, rather than restrictive, as many details may be modified or changed without departing from the spirit or scope of the invention. Accordingly, we do not desire to be restricted to the exact structure described.

We claim:

1. In combination with a rail adapted to support a roller carrying a piece of beef, a beef dropper comprising a main frame plate roller-mounted on said rail, a dropper arm pivotally supported intermediate its ends by said frame plate, a diverting rail integral with said dropper arm, said diverting rail being engageable with and overlying said first mentioned rail to guide a beef-carrying roller from said first mentioned rail to said dropper arm, said dropper arm swinging downwardly about its pivot when said beef-carrying roller passes said pivot, to lower said beef-carrying roller to a desired level, and a top guard rail supported by said main frame plate and extending forwardly of said diverting rail to engage the side of a roller being moved longitudinally along said first rail before said roller engages said diverting rail, said top guard rail conforming in contour to the contour of said diverting rail.

2. In combination with a rail adapted to support a roller carrying a piece of beef, a beef dropper comprising a main frame plate roller-mounted on said rail, a dropper arm pivotally supported intermediate its ends by said frame plate, a diverting rail integral with said dropper arm, said diverting rail being engageable with and overlying said first mentioned rail to guide a beef-carrying roller from said first mentioned rail to said dropper arm, said dropper arm swinging downwardly about its pivot when said beef-carrying roller passes said pivot, to lower said beef-carrying roller to a desired level, a top guard rail supported by said main frame plate and extending forwardly of said diverting rail to engage a roller being moved longitudinally along said first rail before said roller engages said diverting rail, said top guard rail conforming in contour to the contour of said diverting rail, a second arm coupled to said dropper arm, a rod connected at one end to said second arm, and a counterweight connected to the opposite end of said rod, and a hydraulic system including a valve operable to control movement of said rod to thereby permit pivotal movement of said dropper arm.

3. In combination with a rail adapted to support a roller carrying a piece of beef, a beef dropper comprising a main frame plate roller-mounted on said rail, a dropper arm pivotally supported intermediate its ends by said frame plate extending generally parallel to said rail, a diverting rail integral with said dropper arm, said diverting rail being engageable with and overlying said first mentioned rail to guide a beef-carrying roller from said first mentioned rail to said dropper arm, said dropper arm swinging downwardly about its pivot when said beef-carrying roller passes said pivot, to lower said beef-carrying roller to a desired level, a hydraulic system including a valve operable to control pivotal movement of said dropper arm, and stop means independent of said diverting rail to limit the upward movement of said dropper arm and thereby prevent said diverting rail from slamming into engagement with said first mentioned rail.

4. In combination with an overhead rail, a beef dropper comprising a main frame plate, a pair of rollers mounted on said main frame plate, said rollers being supported on said rail, a dropper arm pivotally supported intermediate its ends by said main frame plate and offset laterally from said rail, a diverting rail integral with said dropper arm and offset therefrom to overlie and engage said first mentioned rail, said dropper arm being pivotally movable downwardly by the weight of the beef when a beef-carrying member diverted from said first mentioned rail to said dropper arm passes its pivot, to lower the beef-carrying member to a desired level, and means to control the pivotal movement of said dropper arm.

5. In combination with an overhead rail, a beef dropper comprising a main frame plate, a pair of rollers mounted on said main frame plate, said rollers being supported on said rail, a dropper arm pivotally supported intermediate its ends by said main frame plate and offset laterally from said rail, a diverting rail integral with said dropper arm and offset therefrom to overlie and engage said first mentioned rail, a top guard rail supported by said main frame plate and extending forwardly of said diverting rail to engage a beef-carrying roller being moved longitudinally along said first rail before said beef-carrying roller engages said diverting rail, said top guard rail conforming in contour to the contour of said diverting rail, a prong integral with said dropper arm, said prong being immediately below said diverting rail and conforming generally to the contour thereof to engage the beef-carrying roller and thus insure the transfer of the roller from the said first mentioned rail to the said diverting rail, said dropper arm being movable pivotally downwardly by the weight of the beef when the beef-carrying roller diverted from said first mentioned rail to said dropper arm passes its pivot, to lower the beef-carrying roller to a desired level, and means to control the pivotal movement of said dropper arm.

6. In combination with an overhead rail adapted to support a roller carrying a piece of beef, a beef dropper comprising a main frame plate mounted on said rail, a dropper arm pivotally supported intermediate its ends by said main frame plate and offset laterally from said rail, said dropper arm terminating in a curved end adapted to support a beef-carrying roller in any pivotal position of said dropper arm, a diverting rail integral with said dropper arm, said diverting rail overlying said first mentioned rail and extending into engagement therewith to guide a beef-carrying roller from said first mentioned rail on to said dropper arm, said dropper arm being movable pivotally downwardly by the weight of the beef when the beef-carrying roller diverted from said first mentioned rail to said dropper arm passes its pivot, to lower the beef-carrying roller to a desired level, a second arm secured to said dropper arm to move pivotally therewith, a piston rod secured to one end of said second arm, a counterweight secured to the opposite end of said piston rod, and a hydraulic system including a valve operable to control the movement of said piston rod.

7. In combination with an overhead rail, a beef dropper comprising a main frame plate, a pair of rollers mounted on said main frame plate, means for locking said frame plate to said overhead rail, said rollers being supported on said rail, a dropper arm pivotally supported intermediate its ends by said main frame plate and offset laterally from said rail, a diverting rail integral with said dropper arm and offset therefrom to overlie and engage said first mentioned rail to divert beef-carrying members moved along said first mentioned rail from said first mentioned rail to said dropper arm, said dropper arm being movable pivotally downwardly by the weight of the beef when a beef-carrying member diverted from said first mentioned rail passes the pivot of said dropper arm, and means to control the pivotal movement of said dropper arm.

8. A beef dropper comprising a main frame plate, a pair of rollers rotatably mounted on said plate for mounting said beef dropper on an overhead rail, a shaft supported by said plate, a dropper arm pivoted intermediate its ends on said shaft, said dropper arm having one end adapted to overlie an overhead rail on which said beef dropper is mounted to form a diverting rail to divert a beef-carrying member from said overhead rail to said dropper arm, said dropper arm being adapted to support a beef-carrying member, said dropper arm swinging downwardly about said shaft as said beef-carrying member passes said shaft, to lower said beef-carrying member to a desired level, a second arm mounted on said shaft and adapted to move pivotally with said dropper arm, a counterweight, and a hydraulic system operable to control the pivotal movement of said arms, said hydraulic system including a piston secured at one end to said second arm and at the other to said counterweight, said counterweight being adapted to normally maintain said dropper arm in a non-vertical position when said dropper arm is not supporting a beef, and a valve operable to control the movement of said piston when said dropper arm is to be moved from a vertical position.

9. A beef dropper comprising a main frame plate, a pair of rollers rotatably mounted on said plate for mounting said beef dropper on an overhead rail, a shaft supported by said plate, a dropper arm pivoted intermediate its ends on said shaft, said dropper arm having one end adapted to overlie an overhead rail on which said beef dropper is mounted to form a diverting rail to divert a beef-carrying member from said overhead rail to said dropper arm, said dropper arm being adapted to support a beef-carrying member, said dropper arm swinging downwardly about said shaft as said beef-carrying member passes said shaft, to lower said beef-carrying member to a desired level, a second arm coupled to said dropper arm in the region of said shaft, and means connected to said second arm for applying force thereto for moving said dropper arm.

10. In combination with a rail adapted to support a roller carrying a piece of beef, a beef dropper comprising a main frame plate roller-mounted on said rail, and a dropper arm pivotally supported intermediate its ends by said frame plate, said dropper arm extending generally parallel to said rail and having one end extending angularly to overlie said rail to guide a beef-carrying roller from said rail to said dropper arm, said dropper arm swinging downwardly about its pivot after said beef-carrying roller passes said pivot, to lower the beef-carrying roller to a desired level.

References Cited in the file of this patent

UNITED STATES PATENTS

| | | |
|---|---|---|
| 377,044 | Murrell | Jan. 31, 1888 |
| 994,461 | Harding | June 6, 1911 |
| 1,778,332 | Meyer | Oct. 14, 1930 |
| 2,466,650 | Walker et al. | Apr. 5, 1949 |

FOREIGN PATENTS

| | | |
|---|---|---|
| 53,292 | Germany | Sept. 9, 1890 |